(12) United States Patent
Sutterluetti

(10) Patent No.: US 9,140,289 B2
(45) Date of Patent: Sep. 22, 2015

(54) FIXING DEVICE FOR A FURNITURE FITTING

(71) Applicant: Julius Blum GmbH, Hoechst (AT)

(72) Inventor: Harald Sutterluetti, Fussach (AT)

(73) Assignee: Julius Blum GMBH, Hoechst (AT)

( * ) Notice: Subject to any disclaimer, the term of this patent is extended or adjusted under 35 U.S.C. 154(b) by 0 days.

(21) Appl. No.: 14/187,643

(22) Filed: Feb. 24, 2014

(65) Prior Publication Data

US 2014/0169912 A1 Jun. 19, 2014

Related U.S. Application Data

(63) Continuation of application No. PCT/AT2012/000215, filed on Aug. 23, 2012.

(30) Foreign Application Priority Data

Sep. 1, 2011 (AT) .................................. A 1248/2011

(51) Int. Cl.
   *F16B 35/00*  (2006.01)
   *F16B 35/04*  (2006.01)
   (Continued)

(52) U.S. Cl.
   CPC ............... *F16B 35/041* (2013.01); *A47B 51/00* (2013.01); *E05D 5/02* (2013.01); *E05D 7/02* (2013.01); *F16B 12/14* (2013.01); *E05Y 2600/62* (2013.01); *E05Y 2800/174* (2013.01); *E05Y 2800/29* (2013.01); *E05Y 2900/20* (2013.01)

(58) Field of Classification Search
   CPC ............................. F16B 35/041; F16B 35/045
   USPC ................... 312/111, 315, 326–329; 411/389
   See application file for complete search history.

(56) References Cited

U.S. PATENT DOCUMENTS 7,707,687 B2 * 5/2010 Giovannetti .................... 16/289
8,807,670 B2 * 8/2014 Blum ......................... 312/319.2
(Continued)

FOREIGN PATENT DOCUMENTS

| AT | 503 661 | 12/2007 |
|---|---|---|
| CN | 2844538 | 12/2006 |

(Continued)

OTHER PUBLICATIONS

International Search Report (ISR) issued Nov. 30, 2012 in International (PCT) Application No. PCT/AT2012/000215.

(Continued)

*Primary Examiner* — Daniel Rohrhoff
(74) *Attorney, Agent, or Firm* — Wenderoth, Lind & Ponack, L.L.P.

(57) ABSTRACT

A fixing device for fixes a furniture fitting to an item of furniture. The furniture fitting is able to be fixed to the item of furniture using the fixing device, by selectively using a left-hand or a right-hand furniture-fitting side. The device has a connecting element and a fixing body that has a through-passage. The connecting element is at least partially arranged in the through-passage, movable in a limited manner relative to the fixing body, and has at least two connecting element stops as well as two connecting element regions for fixing the furniture fitting to the item of furniture. At least two stops are designed in or on the fixing body, and when in the assembly position, one of these two stops corresponds, in each case, to one of the two connecting element stops.

20 Claims, 11 Drawing Sheets

(51) Int. Cl.
  *E05D 5/02*  (2006.01)
  *E05D 7/02*  (2006.01)
  *A47B 51/00* (2006.01)
  *F16B 12/14* (2006.01)

(56) References Cited

U.S. PATENT DOCUMENTS

| | | | |
|---|---|---|---|
| 2006/0104742 A1* | 5/2006 | Fleming | 411/389 |
| 2007/0053766 A1* | 3/2007 | Lin | 411/389 |
| 2007/0177959 A1* | 8/2007 | Chopp et al. | 411/389 |
| 2013/0232769 A1* | 9/2013 | Wooten | 29/525.11 |

FOREIGN PATENT DOCUMENTS

| | | |
|---|---|---|
| DE | 10 2007 049 143 | 6/2008 |
| JP | 2011-507565 | 3/2011 |
| WO | 2009/080403 | 7/2009 |

OTHER PUBLICATIONS

Austrian Patent Office Search Report (ASR) issued Apr. 20, 2012 in Austrian Patent Application A 1248/2011.

Japanese Office Action issued Mar. 10, 2015 in corresponding Japanese Patent Application No. 2014-527430 (with English translation).

* cited by examiner

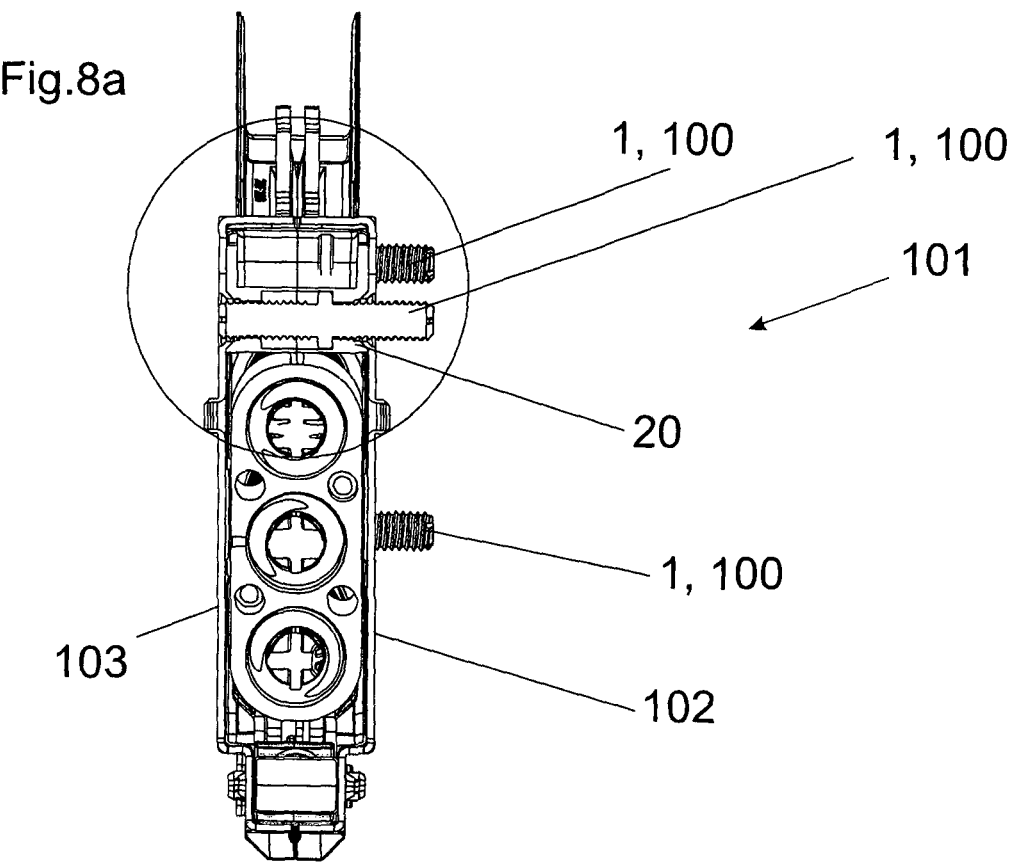
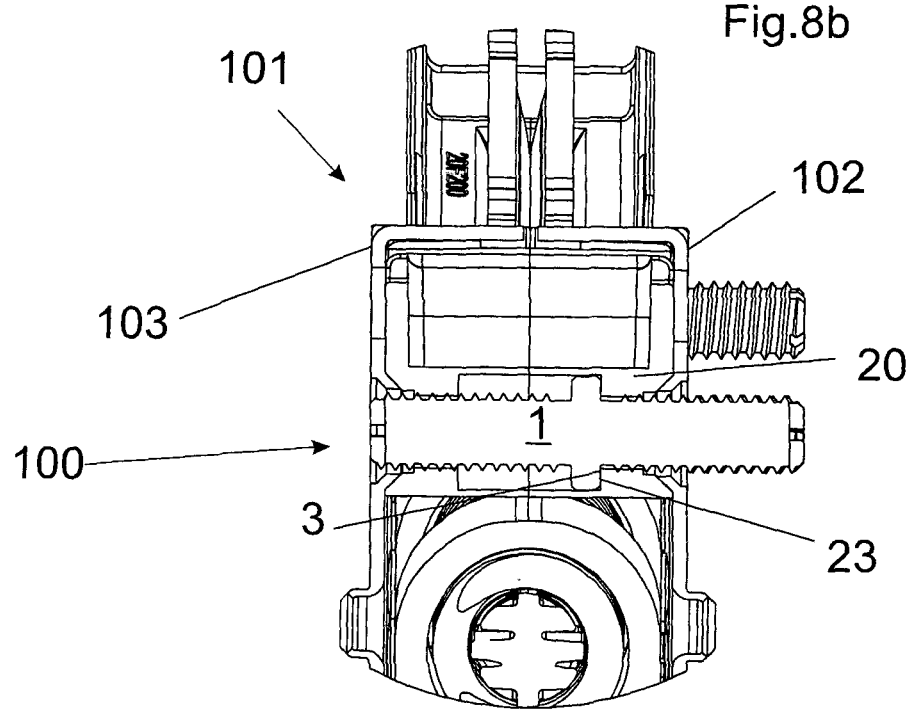

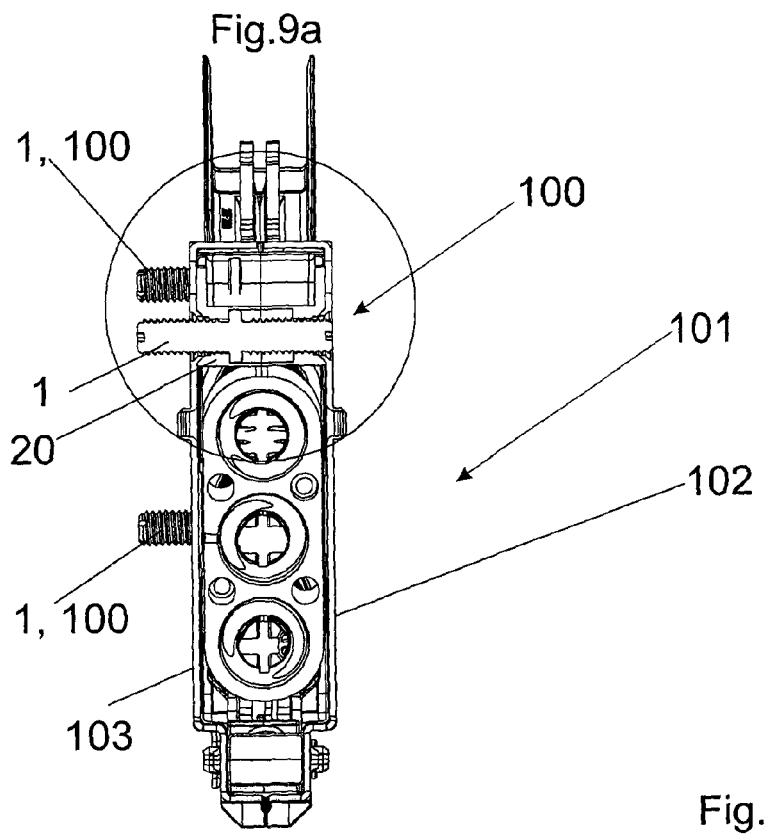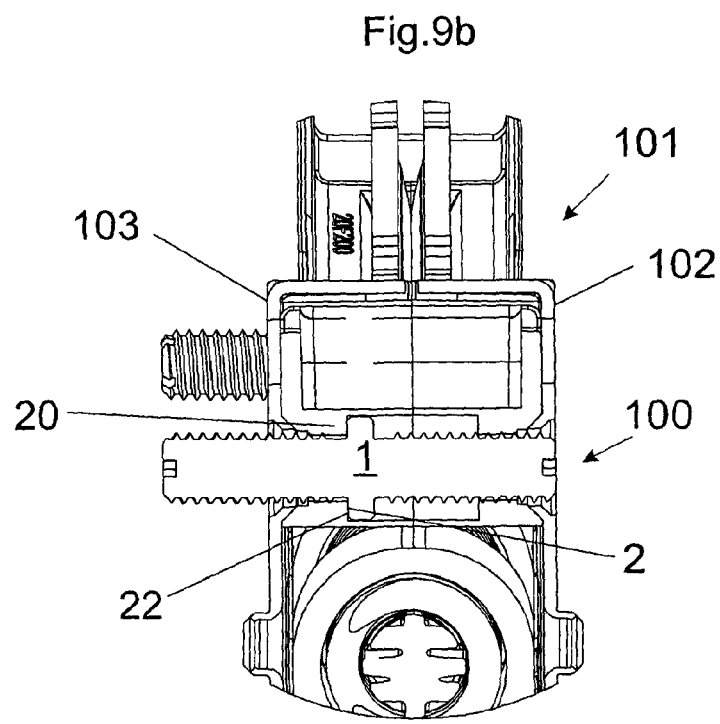

FIXING DEVICE FOR A FURNITURE FITTING

BACKGROUND OF THE INVENTION

The invention concerns a fixing device for fixing a furniture fitting to an article of furniture, wherein the furniture fitting can be fixed to the article of furniture with the fixing device selectively with a left-hand or a right-hand furniture fitting side.

The invention further concerns a furniture fitting for an article of furniture having such a fixing device. The invention further concerns an article of furniture having such a furniture fitting.

A fixing device of that kind is shown for example in AT 503 661 A4 dated Dec. 15, 2007. A furniture fitting—which here is in the form of an actuating drive for a furniture flap—is fixed to a furniture body by means of that fixing device. In that case the actuating drive is of such a configuration that it can be fixed both to the left-hand side and also the right-hand side of the furniture body and both assembly positions can thus be implemented with one structure for the actuating drive. For that purpose the fixing device has through openings from one actuating drive side to the other. A connecting element—normally a screw—is introduced into those through openings and the actuating drive is screwed fast to the furniture body by means of that screw. To carry out assembly at the other side of the furniture body the screw is introduced from the other actuating drive side into the through opening in the fixing device—in that way the actuating drive can be screwed on the other side of the body.

SUMMARY OF THE INVENTION

The object of the invention is to provide a fixing device which is improved over the state of the art, for fixing a furniture fitting to an article of furniture.

That object is attained by a fixing device having the features of a connecting element and a fixing body having a through opening. The connecting element is at least partially arranged in the through opening and the connecting element is limitedly movable relative to the fixing body. The connecting element has at least two connecting element abutments and further two connecting element regions for fixing the furniture fitting to the article of furniture. At least two abutments are provided in or on the fixing body so that a respective one of the two abutments corresponds to one of the two connecting element abutments in the assembly position.

By virtue of the fact that the connecting element has both two connecting element abutments and also two connecting element regions for fixing the furniture fitting to the article of furniture, the connecting element does not have to be removed from the fixing device or the furniture fitting in order to assemble the furniture fitting with the fixing device at an opposite side of the article of furniture.

Because the connecting element is arranged at least in part in the through opening and the connecting element is limitedly moveable relative to the fixing body the connecting element can remain in the through opening in the fixing body and it is thus possible to provide that the connecting element does not become lost—as it is only limitedly moveable relative to the fixing body.

The provision of two abutments in or on the fixing body and the two connecting element abutments of the connecting element provide that each individual connecting element abutment can correspond to one of the two abutments on the fixing body—unlike the state of the art in which the connecting element has only one connecting element abutment (the head of a screw for example).

Further advantageous configurations of the invention are defined in the appended claims.

It has proven to be particularly advantageous if the connecting element and the fixing body are jointly in the form of a pre-assembled inseparable structural unit. That can provide that the connecting element cannot be separated from the fixing body and this can therefore ensure that the connecting element does not become lost.

In a preferred embodiment it can be provided that the connecting element extends substantially completely through the through opening in the fixing body.

It can further preferably be provided that in the assembly condition the connecting element is received on the one hand sunk in the through opening in the fixing device and on the other hand in the article of furniture. It is thus possible in that way to achieve an aesthetically attractive fixing device in the assembly condition as the fact that the connecting element is sunk in the fixing device means that the connecting element does not project laterally beyond the fixing device.

It has been found to be particularly advantageous if the connecting element is in one piece. The assembly times can be kept short by virtue of a one-piece configuration for the connecting element.

It can particularly preferably be provided that the connecting element abutments project radially from the connecting element.

In that respect it has proven to be particularly advantageous if the connecting element abutments are in the form of a flange on the connecting element.

In a preferred embodiment it can be provided that the connecting element regions can be connected to the article of furniture in force-locking and/or positively locking relationship.

It has further proven to be particularly advantageous if the two connecting element regions are formed on the connecting elements symmetrically relative to each other.

It has further proven to be advantageous if in the assembly position a connecting element region projects beyond the left-hand or the right-hand furniture fitting side. The fact that the connecting element region projects beyond the furniture fitting sides means that the connecting element can penetrate into and be fixed in the furniture body.

Preferably it can further be provided that the connecting element regions of the connecting element have a respective thread. Fixing can be easily effected by the use of a thread.

In a possible embodiment it can be provided that the connecting element has two ends, wherein the two ends of the connecting element are in the form of screw bolts.

In a preferred embodiment it can be provided that two separate tool receiving means are provided on the connecting element. The provision of two independent tool receiving means that each can be used individually for fitting to a furniture fitting side.

Desirably the tool receiving means are in the form of a slot or a cross slot or a hexagonal recess or hexalobular recess.

Equally it has proven to be advantageous if the connecting element is in the form of a doubled end bolt screw with flange.

In an embodiment of the invention the fixing body is provided substantially completely in the furniture fitting. The provision of the fixing body in the furniture fitting means that the furniture fitting can be prefabricated as a complete structural assembly and no additional assembly procedure is necessary when mounting the furniture fitting to the article of furniture.

In that respect it is particularly preferably provided that the abutments on the fixing body are provided in the furniture fitting in spaced relationship with the left-hand and right-hand furniture fitting side. Thus the abutments of the fixing body are provided in the interior of the furniture fitting, which can contribute to making it possible to manufacture a slender furniture fitting.

In specific terms protection is also claimed for a furniture fitting for an article of furniture having at least one fixing device for fixing the furniture fitting to the article of furniture in accordance with at least one of the described embodiments. In a preferred embodiment it can be provided that the furniture fitting is in the form of an ejection device, drive device, pull-in device or damping device for a moveable furniture part or in the form of an actuating drive for a furniture flap or in the form of a drawer extension guide or in the form of a lighting device.

Protection is also claimed for an article of furniture having a furniture fitting in accordance with at least one of the described embodiments.

BRIEF DESCRIPTION OF THE DRAWINGS

Further details and advantages of the invention will be described more fully hereinafter by means of the specific description with reference to the embodiments by way of example illustrated in the drawings in which:

FIG. 8b shows a detail view of FIG. 8a, FIG. 9a shows a section through a furniture fitting and its fixing device, FIG. 9b shows a detail view of FIG. 9a, FIGS. 10a through 10d show various views of a connecting element.

DETAILED DESCRIPTION OF THE PREFERRED EMBODIMENTS

Figure 1:
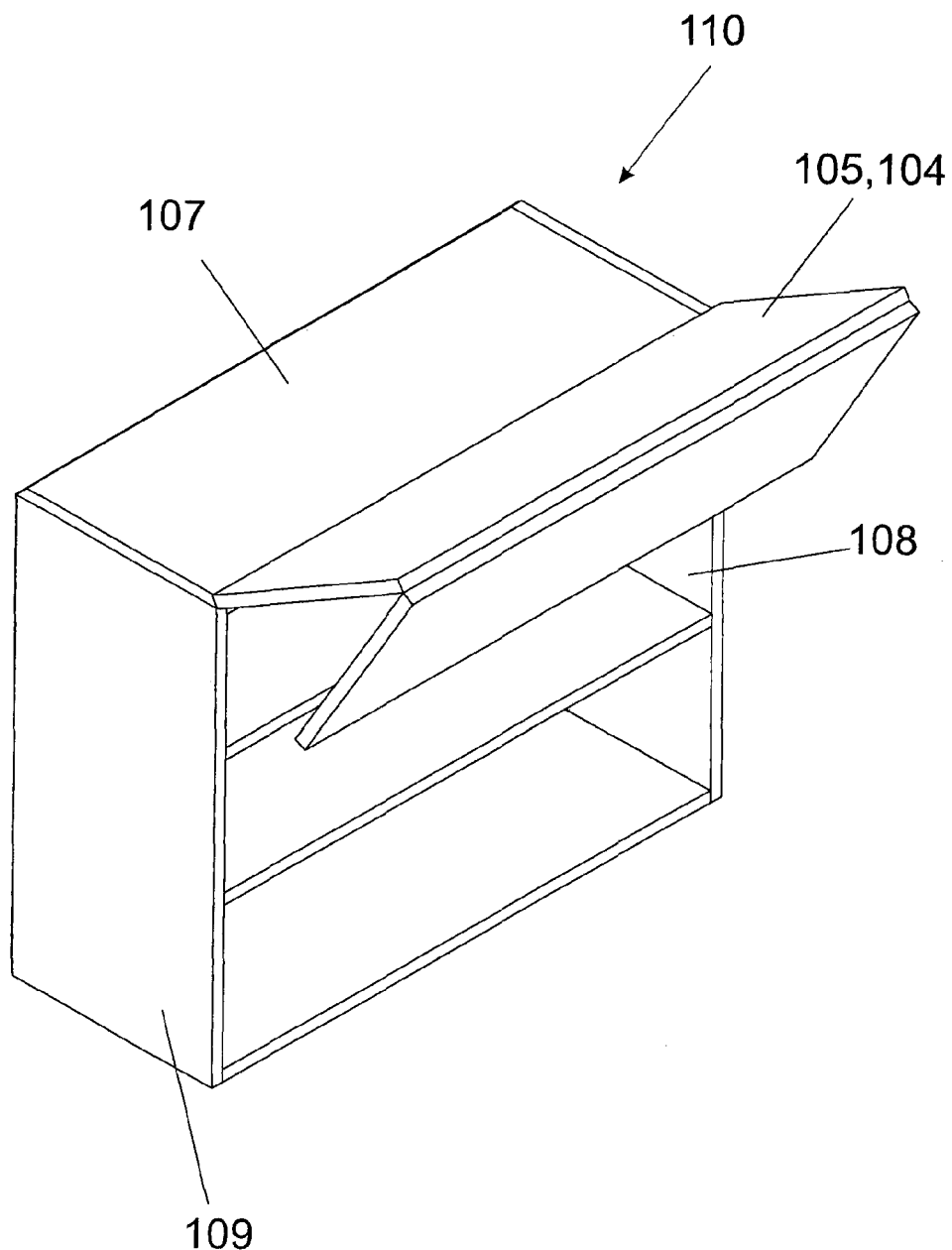
FIG. 1 shows a perspective view of an article of furniture with a furniture flap.

FIG. 1 shows a perspective view of an article of furniture 110. This article of furniture 110 has a furniture body 107 and a moveable furniture part 104 which is in the form of a furniture flap 105. The furniture body 107 further has a right-hand furniture body side 108 and a left-hand furniture body side 109.

Figure 2:
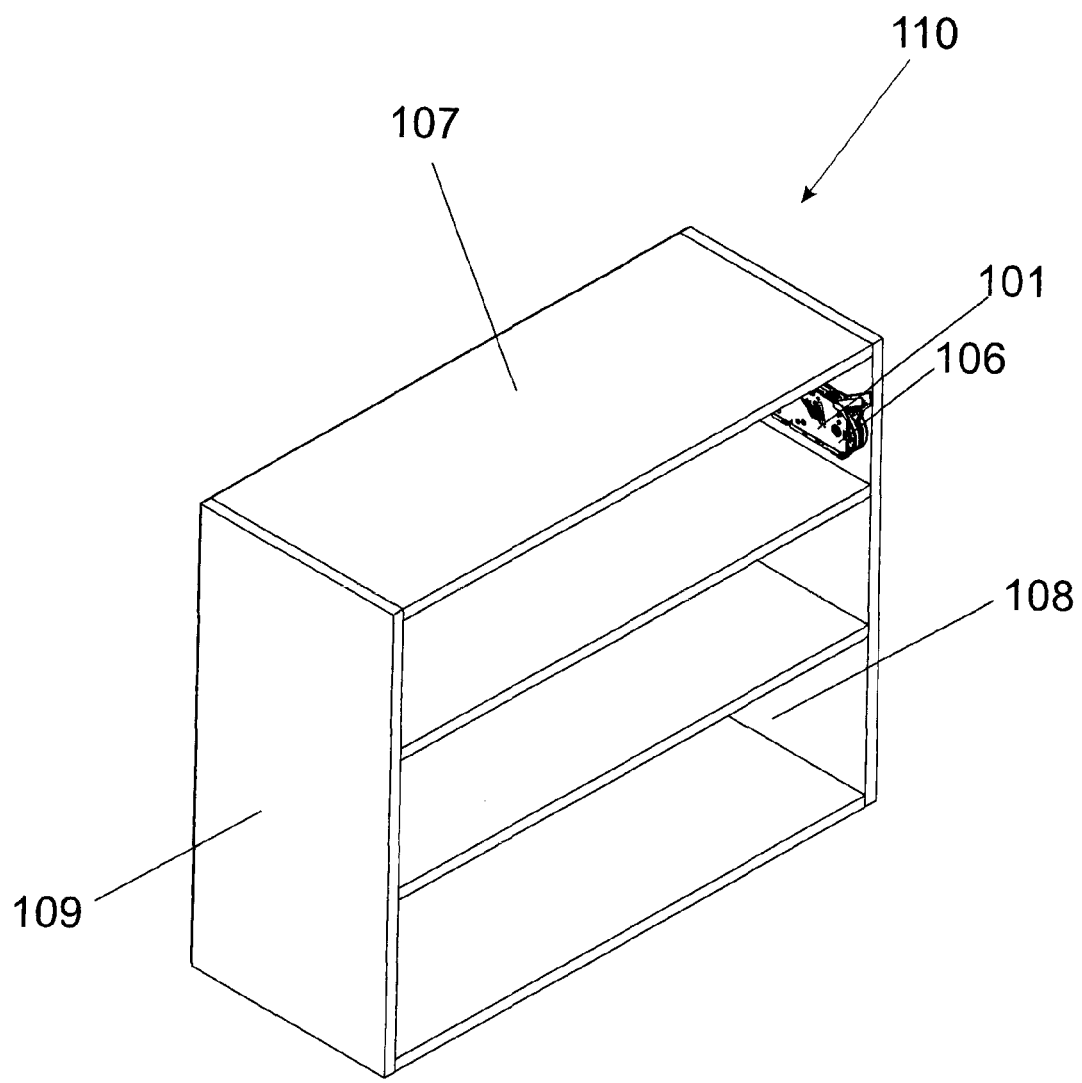
FIG. 2 shows a perspective view of an article of furniture with the furniture flap removed.

The furniture fitting 101 is fixed to those furniture body sides 108 and 109—as shown in FIG. 2—by means of a fixing device which is not shown here. In this embodiment the furniture fitting 101 is in the form of an actuating drive 106 for the furniture flap 105 which is not shown here (see in that respect FIG. 1).

A further furniture fitting 101 is fixed on the opposite left-hand furniture body side 109 (not visible in this view). In order not to have to produce two different configurations for furniture fittings 101 for mounting to the left-hand and a right-hand furniture body side respectively those furniture fittings 101 are often of a symmetrical configuration, that is to say one and the same furniture fitting 101 can be fixed both on the left-hand furniture body side 109 and also on the right-hand furniture body side 108. In this and also in the following Figures, reference is respectively made to a furniture fitting 101 which is fixed to a left-hand 109 or right-hand furniture body side wall 108 of a furniture fitting 110. It will be self-evident that it is naturally also possible to give thought to furniture fittings 101 which are not fixed on the left-hand 109 or right-hand furniture body side wall 108 but at another side of the article of furniture 110—like for example the bottom or the top of the furniture body 107 or on one of the shelves arranged in the furniture body 107 or also on a moveable furniture part (like a furniture flap), a drawer or the like.

The only important consideration in that respect is that the furniture fitting 101 involves a structural unit of symmetrical configuration, which makes it possible for the furniture fitting 101 itself to be arranged at two different furniture fitting sides (like for example a left-hand furniture fitting side 102 and a right-hand furniture fitting side 103) at one side of the article of furniture 110 (see FIGS. 5a through 9b).

Figure 3:
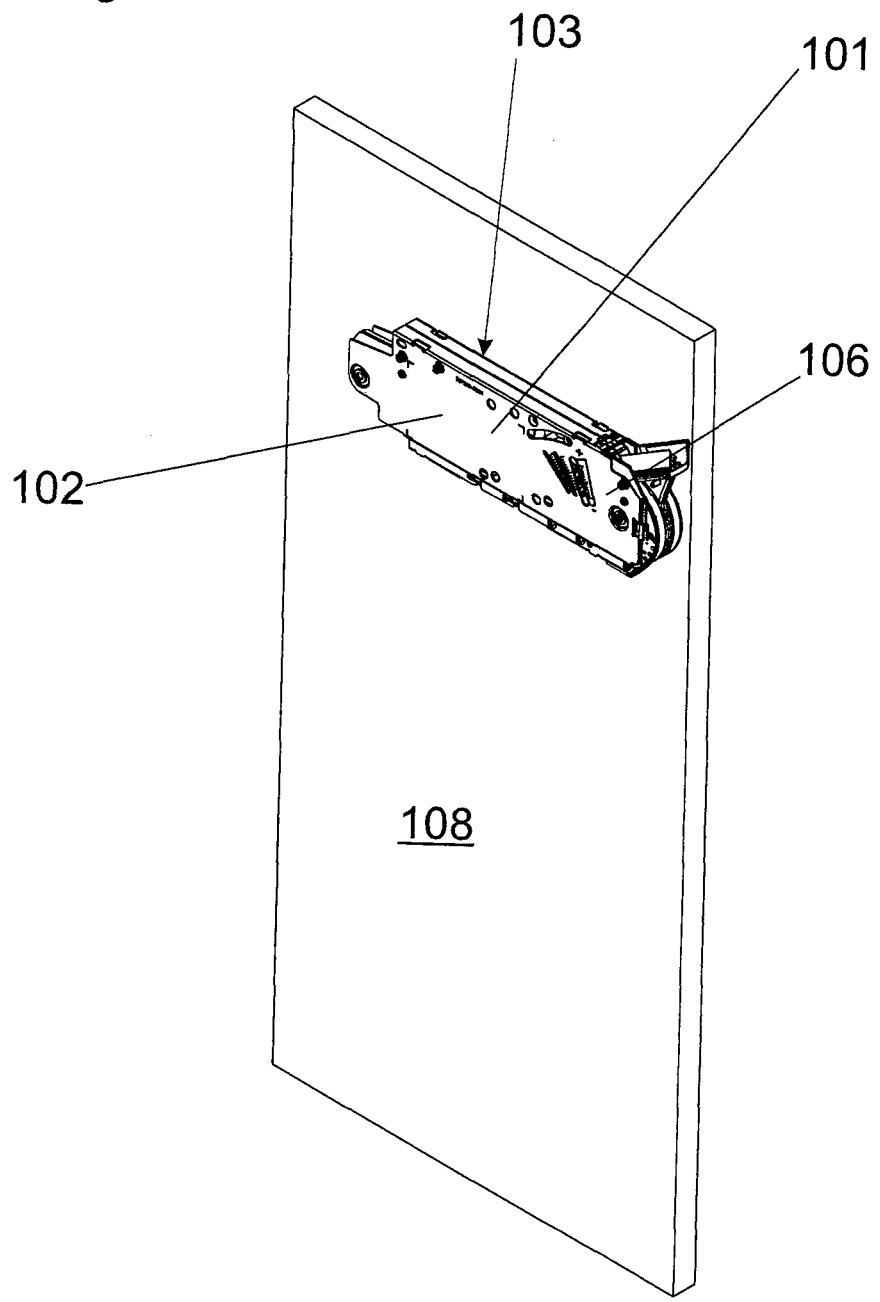
FIG. 3 shows a perspective view of a side wall of a furniture body of an article of furniture with a furniture fitting mounted thereon.

FIG. 3 shows the right-hand furniture body side 108 to which the furniture fitting 101 was fixed in the upper region with its right-hand furniture fitting side 103, on the right-hand furniture body side 108. In this preferred embodiment this furniture fitting 101 is in the form of an actuating drive 106 for a furniture flap 105 (not shown here).

That furniture fitting 101 could equally well have been fixed with its left-hand furniture fitting side 102 on a left-hand furniture body side 109 (not shown here)—by virtue of the symmetrical configuration of the furniture fitting 101.

Figure 4A:
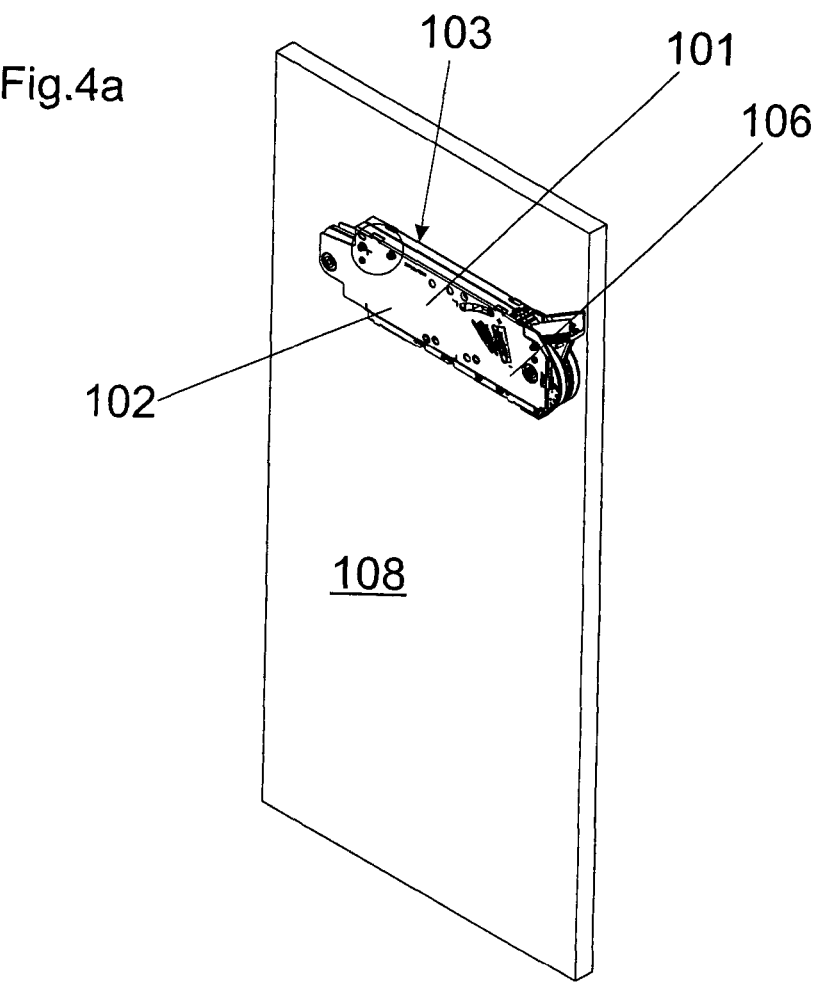
FIG. 4a shows a perspective view of an article of furniture side wall as shown in FIG. 3.

FIG. 4a shows the furniture fitting 101 at the right-hand furniture body side 108 as just described with reference to FIG. 3.

Figure 4B:
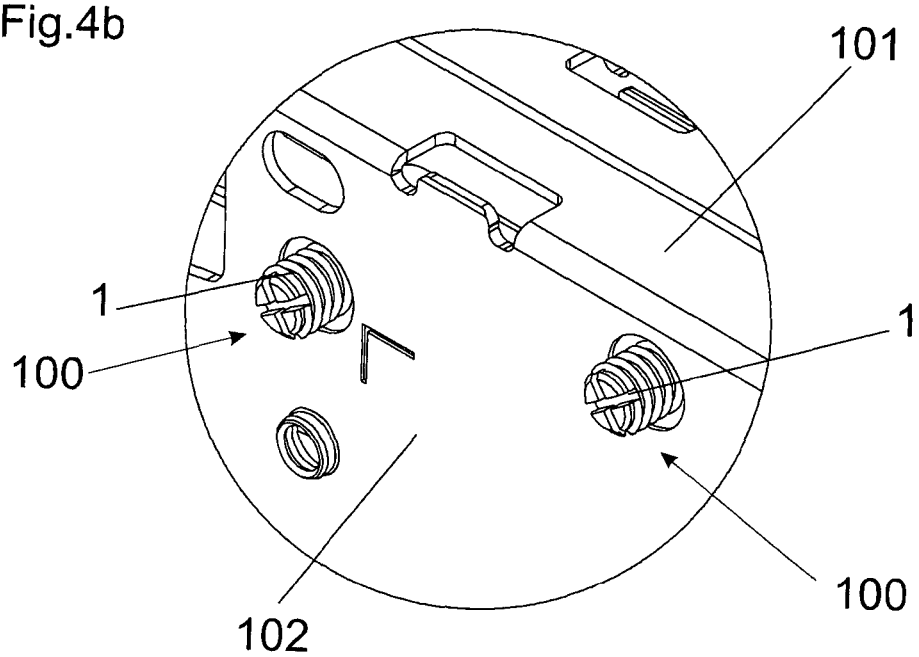
FIG. 4b shows a detail view of FIG. 4a, FIG. 5a shows a perspective view of an article of furniture side wall as in FIG. 3.

FIG. 4b now shows a detail view of FIG. 4a in which a fixing device 100 of the furniture fitting 101 is partly visible. In this case the fixing device 100 has a connecting element 1 which projects beyond the left-hand furniture fitting side 102 of the furniture fitting 101. The furniture fitting 101 can be fixed to the right-hand furniture body side 108 by means of the connecting element 1. To permit a durable and stable fixing, the furniture fitting 101 in this case has a plurality of fixing devices 100, two of those fixing devices 100 being visible in the detail view in FIG. 4b.

Figure 5A:
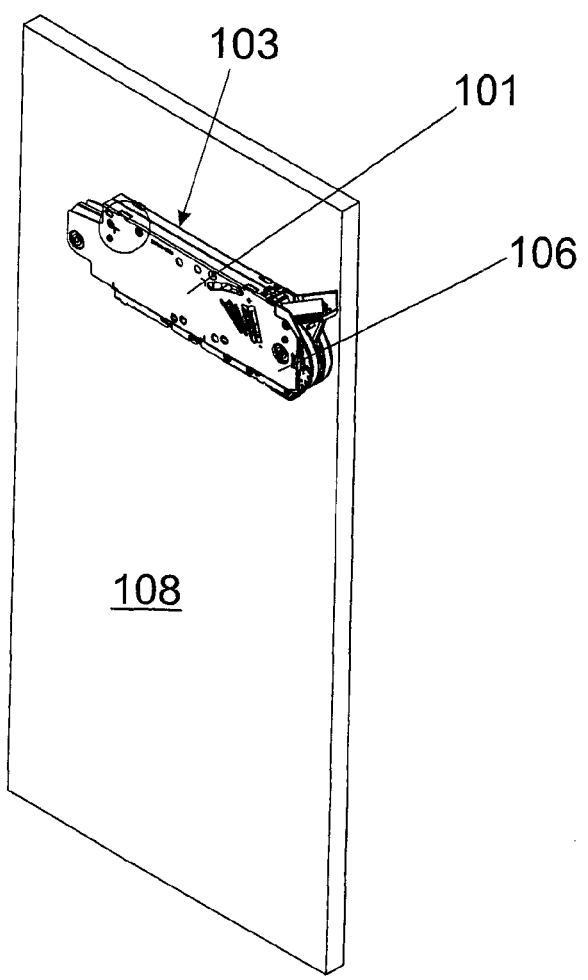
FIG. 5b shows a detail view of FIG. 5a, FIG. 6a shows a perspective side view of a furniture fitting with a section in relation to a fixing device.
Figure 5B:
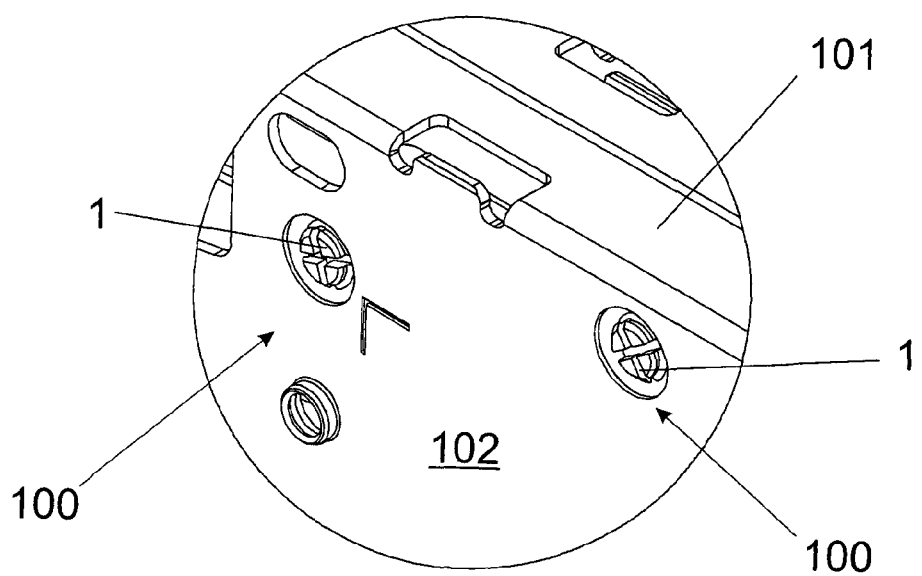

Because the two connecting elements 1 still project beyond the left-hand furniture fitting side 102 it can be seen that the furniture fitting 101 has not yet been completely fixed to the right-hand furniture body side 108. Fixing is only effected in its entirety when the connecting element 1 has been completely screwed in—as is shown in FIGS. 5a and 5b.

Figure 6A:
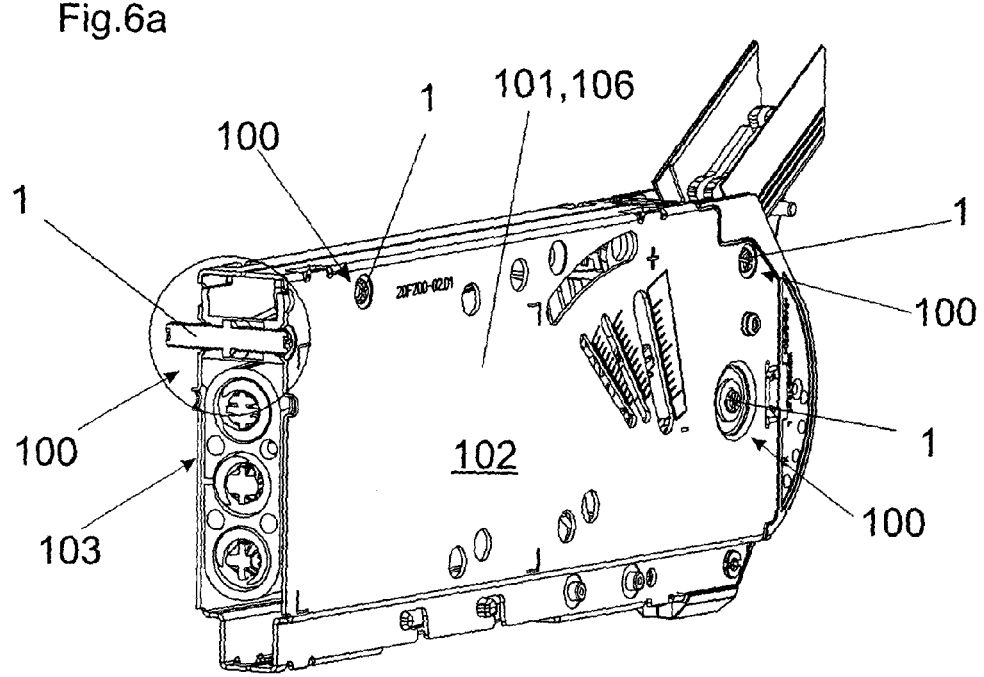
FIG. 6b shows a detail view of FIG. 6a, FIG. 7a shows a perspective side view of a furniture fitting with a section in relation to a fixing device.

FIG. 6a shows a perspective view of a furniture fitting 101. This furniture fitting 101 has a plurality of fixing devices 100, a sectional view being provided in relation to one of those fixing devices 100 in order to show the interior of the furniture fitting 101.

In this preferred embodiment the furniture fitting 101 is in the form of an actuating drive 106 for a furniture flap 105 (not shown, see FIG. 1). The furniture fitting 101, here an actuating drive 106, is of a symmetrical configuration, that is to say it can be fixed both to a left-hand and also a right-hand furniture body side with its left-hand furniture fitting side 101 or with its right-hand furniture fitting side 103, by way of the fixing devices 100.

It will be appreciated that the furniture fitting could also be in the form of an ejection device, drive device, pull-in device or damping device for a moveable furniture part 104 (see FIG. 1) or—as shown here—in the form of an actuating drive 106 for a furniture flap 105 or in the form of a drawer extension guide or in the form of a lighting device. It is equally possible to envisage any other unit which can be synchronous in order to be fixed to at least two different mounting positions in or on an article of furniture 110 (see FIG. 1) by way of a fixing device 100.

Figure 6B:
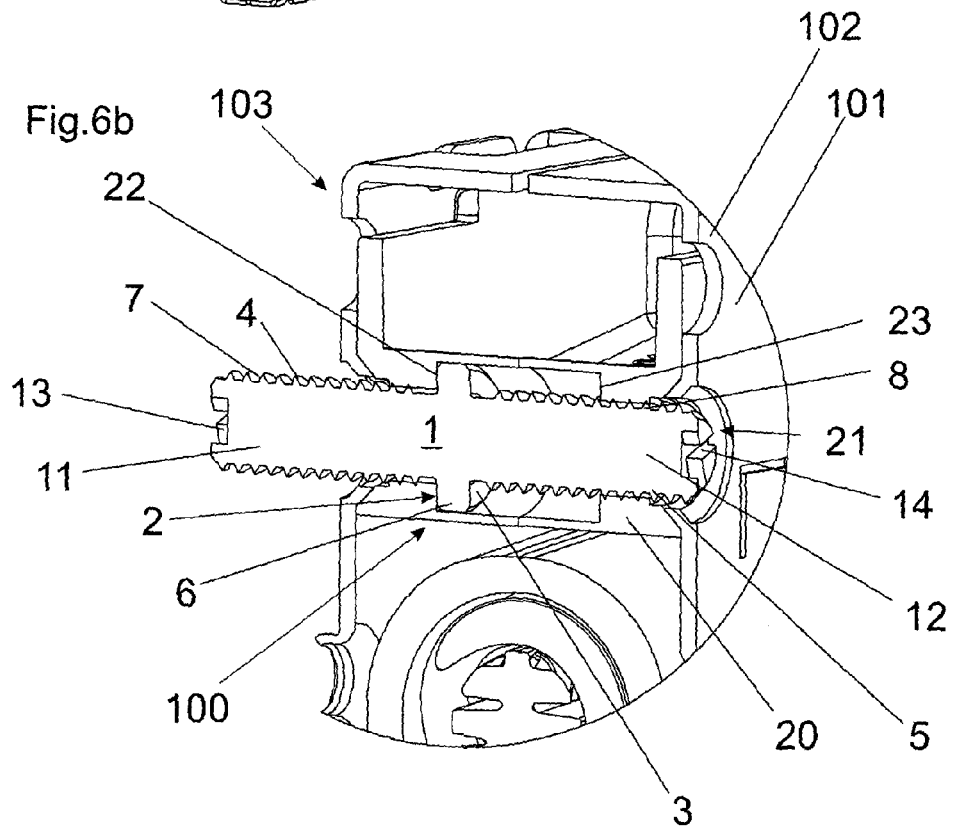

FIG. 6*b* shows a detail view of FIG. 6*a* in the case of one of the fixing devices 100 in the furniture fitting 101.

This fixing device 100 serves for fixing the furniture fitting 101 to an article of furniture 110 (see FIG. 1), wherein the furniture fitting 101 can be fixed to the article of furniture 110 selectively with a left-hand 102 or right-hand furniture fitting side 103, with the fixing device 100. For that purpose the fixing device 100 has a connecting element 1, wherein the connecting element 1 has at least two connecting element abutments 2 and 3 and in addition the connecting element 1 has two connecting element regions 4 and 5 for fixing the furniture fitting 101 to the article of furniture 110. In addition the fixing device 101 has a fixing body 20 with a through opening 21, wherein the connecting element 1 is arranged at least partially and preferably substantially completely in the through opening 21 and the connecting element 1 is limitedly moveable relative to that fixing body 20. The fixing body 20 further has two abutments 22 and 23, wherein a respective one of those abutments 22 and 23 corresponds in an assembly position to one of the two connecting element abutments 2 and 3.

As can be clearly seen from this view the connecting element 1 extends substantially completely through the through opening 21 in the fixing body 20.

In the assembly condition the connecting element 1 is sunk in the through opening 21 in the fixing device 20, on the other side the connecting element 1 penetrates into a wall of the article of furniture 110 (not shown) and is fixed there.

In this view in FIG. 6*b* the abutment 22 of the fixing body 20 corresponds to the connecting element abutment 2 and bears against same.

For assembly purposes the furniture fitting 101 is held with its right-hand furniture fitting side 103 against a wall (not shown here) of an article of furniture 110 (see FIG. 1). Preferably prefabricated openings are provided at the wall of the article of furniture 110, the openings corresponding to the connecting element regions 4 and 5 of the connecting element 1. When the end of the connecting element 1 is disposed over the opening at the wall of the article of furniture 110 the connecting element 1 can be screwed by way of its tool receiving means 14 into the wall of the article of furniture 110. For that purpose the connecting element 1 has a respective thread 7 and 8 at its connecting element regions 4 and 5. As shown here the thread 7 of the connecting element 1 would penetrate into the wall of the article of furniture 110.

As soon as the connecting element abutment 2 of the connecting element 1 meets the abutment 22 of the fixing body 20 the fixing device 100 and therewith the furniture fitting 101 is drawn towards the wall of the article of furniture 110. As soon as the right-hand furniture fitting side 103 meets the wall of the article of furniture 110 the furniture fitting 101 is fixed to the article of furniture 110 by way of the connecting element 1 and the fixing body 20.

In this preferred embodiment the connection between the connecting element 1 and the wall of the article of furniture 110 is made by way of a thread 7. It will be appreciated that this is only one of the possible configurations for such a connecting element 1. It is self-evident to the man skilled in the art that it is also possible to envisage any other possible force-locking and/or positively locking connection to the article of furniture 110. Thus that connection could be made for example by way of a spreader device or a press connection, a clamping device or the like.

As can be clearly seen from this view the fixing body 20 of the fixing device 100 is provided completely in the interior of the furniture fitting 101 and forms therewith a compact prefabricated assembly.

It can also be clearly seen from this view that the connecting element 1 is symmetrical, a flange 6 being disposed in the center of the connecting element 1. On that flange 6 the connecting element abutment 2 is provided on one side and the connecting element abutment 3 is provided on the other side. The two connecting element regions 4 and 5 which each have a respective thread 7 and 8 are also formed symmetrically with each other. Thus the connecting element regions 4 and 5 together with their receiving means 13 and 14 represent screw bolts 11 and 12, wherein the respective mutually opposite tool receiving means is involved in fixing of the connecting element region. In other words the connecting element region 4 is connected to the article of furniture 110 by way of the tool receiving means 14 and the connecting element region 5 is connected to the article of furniture 110 by way of the tool receiving means 13.

Figure 7A:
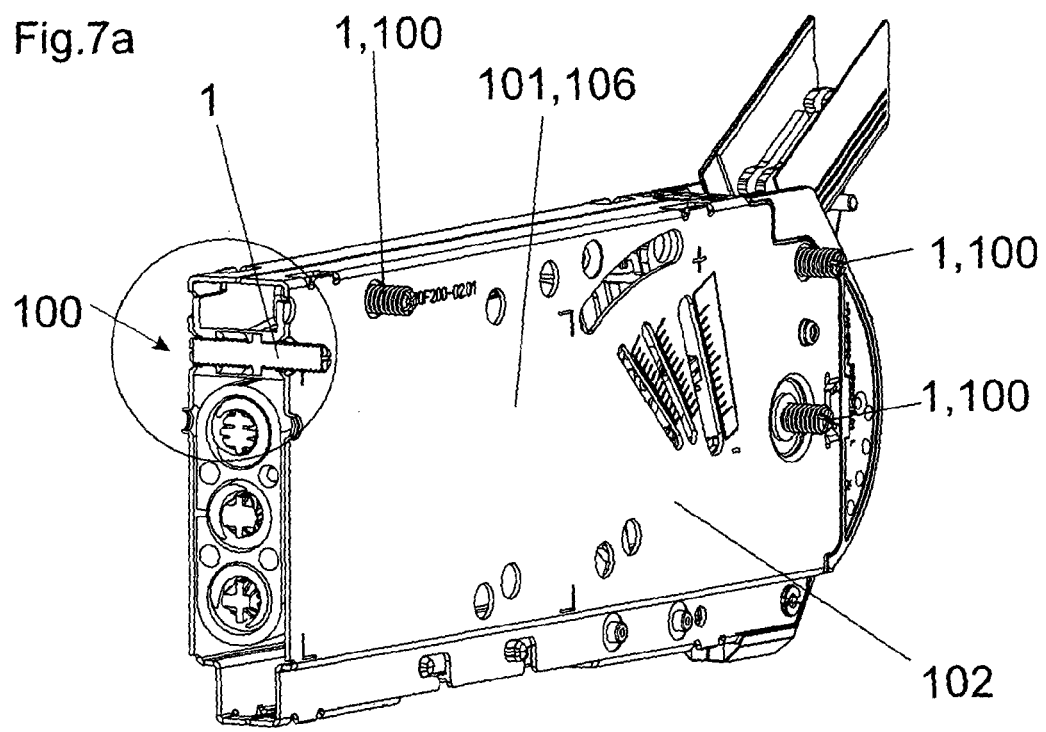
FIG. 7b shows a detail view of FIG. 7a, FIG. 8a shows a section through a furniture fitting and its fixing device.
Figure 7B:
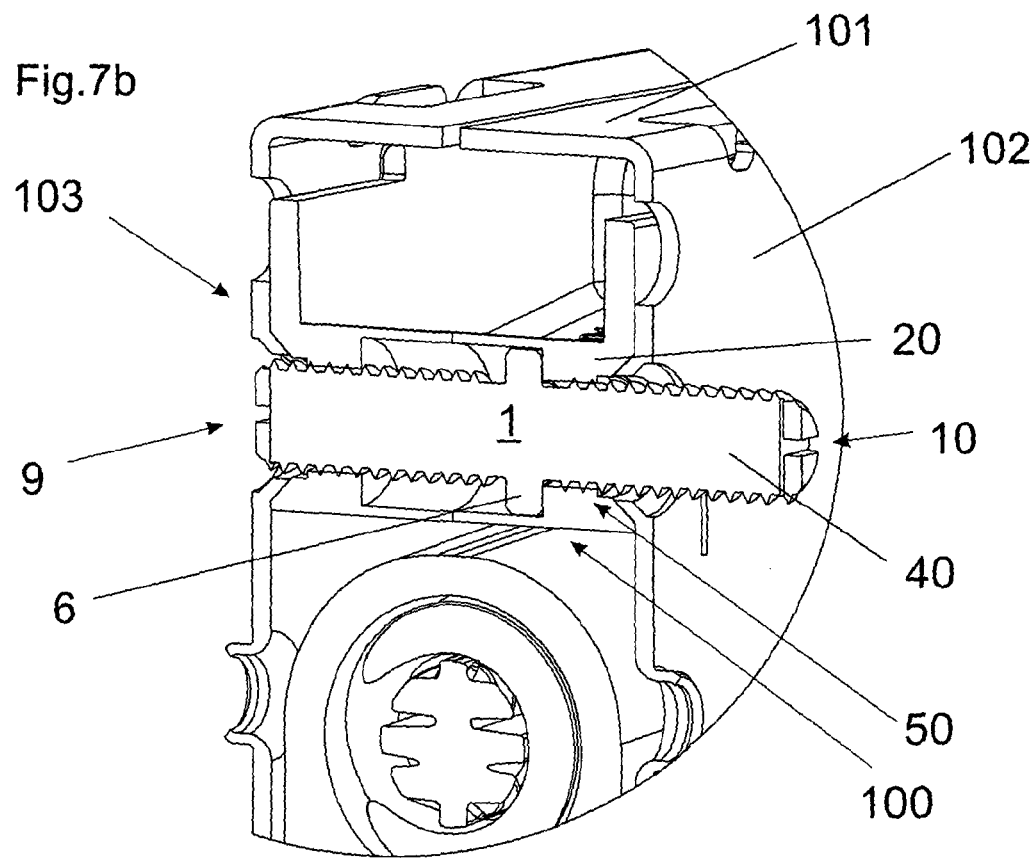

FIGS. 7*a* and 7*b* now show fitment of the same furniture fitting 101 on an oppositely disposed wall of an article of furniture 110 (not shown). Correspondingly everything referred in relation to FIGS. 6*a* and 6*b* applies here, except that this involves fitment of the furniture fitting 101 with its left-hand furniture fitting side 102 to an article of furniture 110 (not shown here).

As can be clearly seen from FIGS. 7*a* and 7*b* the connecting element 1 and the fixing body 20 of the fixing device 100 jointly form a pre-assembled inseparable structural unit 50. In that way it is possible to avoid the connecting element 1 becoming lost prior to fitment of the fixing device 100 or the associated furniture fitting 101.

The fixing device 100 with the furniture fitting 101 also jointly forms a pre-assembled inseparable structural assembly.

The furniture fitting 101 shown here has four fixing devices 100 with which the furniture fitting 101 is fixed to an article of furniture 110. That serves to ensure a secure hold. It will be appreciated that it is also possible to envisage only one fixing device 100 being sufficient for fixing the furniture fitting 101 to an article of furniture 110.

It can be clearly seen from FIGS. 6*b* and 7*b* that the connecting element regions 4 and 5 of the connecting element 1, in the mounting position of the fixing device 100 or of the furniture fitting 101, project beyond the left-hand furniture fitting side 102 and the right-hand furniture fitting side 103 respectively and can thus penetrate with their connecting element regions 4 and 5 into the article of furniture 110. On the other side the connecting element 1 disappears in the interior of the fixing device 100 and thus in the interior of the furniture fitting 101 and thus forms an aesthetically attractive assembly as in the mounting condition nothing projects beyond the left-hand furniture fitting side 102 and the right-hand furniture fitting side 103 respectively. It can further be clearly seen from this FIG. 7b view that the two ends 9 and 10 of the connecting element 1 are in the form of screw bolts 11 and 12 and in this preferred embodiment the connecting element 1 is in the form of a doubled end bolt screw 40 with flange 6.

FIGS. 8a and 8b and FIGS. 9a and 9b respectively show sections through side views of the furniture fitting 101.

In this respect the views in FIGS. 8a and 8b correspond to the perspective views in FIGS. 7a and 7b, and the situation is likewise with FIGS. 9a and 9b, these corresponding to the perspective views in FIGS. 6a and 6b.

The description relating to FIGS. 6a and 6b thus also applies to FIGS. 9a and 9b, and likewise with regard to the description of FIGS. 7a and 7b, in respect of FIGS. 8a and 8b.

It can be clearly seen from FIGS. 8b and 9b that the fixing body 20 is provided completely in the furniture fitting 101 and does not project beyond the left-hand and right-hand furniture fitting sides 102 and 103. The abutments 22 and 23 of the fixing body 20 are provided in the furniture fitting 101—in spaced relationship with the left-hand and right-hand furniture fitting sides 102 and 103 respectively. That makes it possible to achieve a compact assembly.

FIGS. 10a through 10d each show a respective connecting element 1. In this preferred embodiment the connecting element 1 is in one piece—as can be clearly seen here.

In this case the connecting element 1 has two connecting element regions 4 and 5 which in this preferred embodiment are in the form of threads 7 and 8 respectively. Likewise the connecting element 1 has two connecting element abutments 2 and 3 which in this preferred embodiment project radially from the connecting element 1. It is particularly preferably provided here that the connecting element abutments 2 and 3 are in the form of a flange 6 on the connecting element 1.

Figure 10A:
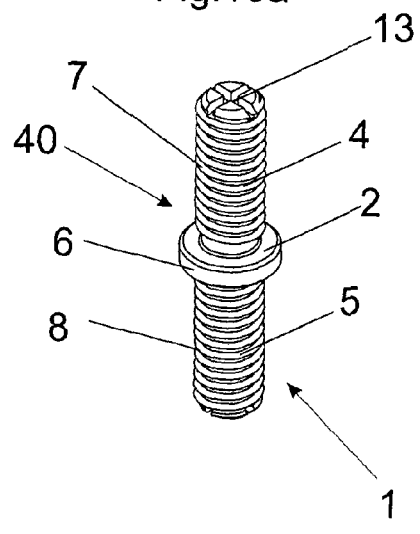
Figure 10B:
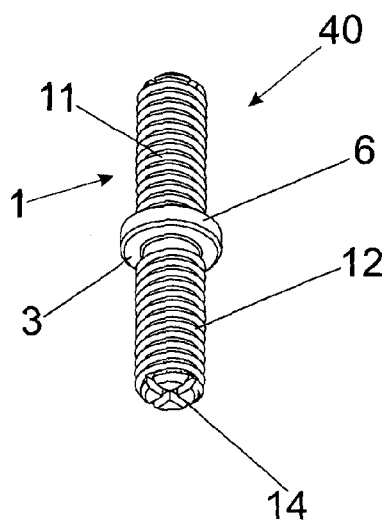
Figure 10C:
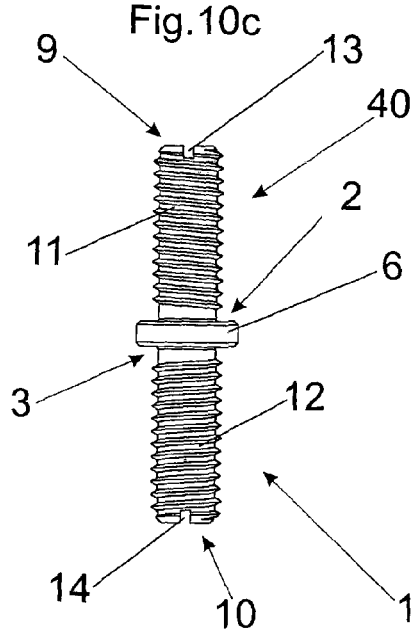
Figure 10D:
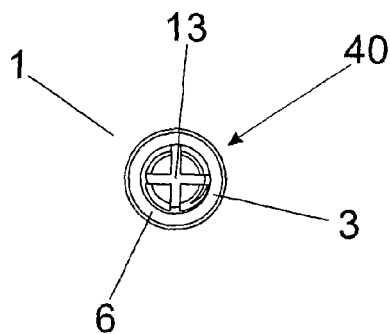

It can be clearly seen from FIG. 10c that the two ends 9 and 10 of the connecting element 1 are in the form of screw bolts 11 and 12.

Provided on the connecting element 1 are two separate tool receiving means 13 and 14, by way of which the connecting element 1 can be screwed into an article of furniture 110 (not shown here). As preferably shown here the tool receiving means 13 and 14 are in the form of cross slot tool receiving means, equally it can naturally be envisaged that those tool receiving means 13 and 14 are adapted for other appropriate tools, like for example in the form of a slot or a hexagonal recess or a hexolobular recess or the like.

As can further be clearly seen from FIG. 10c the two connecting element regions 4 and 5 of the connecting element 1 are symmetrical with each other, strictly speaking in this preferred embodiment the entire connecting element 1 is of a symmetrical configuration—in the form of a doubled end bolt screw 40 with flange 6.

The principle regarding that symmetrical fixing of a furniture fitting 101 to an article of furniture 110 (not shown here) will now be described with reference to FIG. 11a and in a variant thereof in FIG. 11b.

Figure 11A:
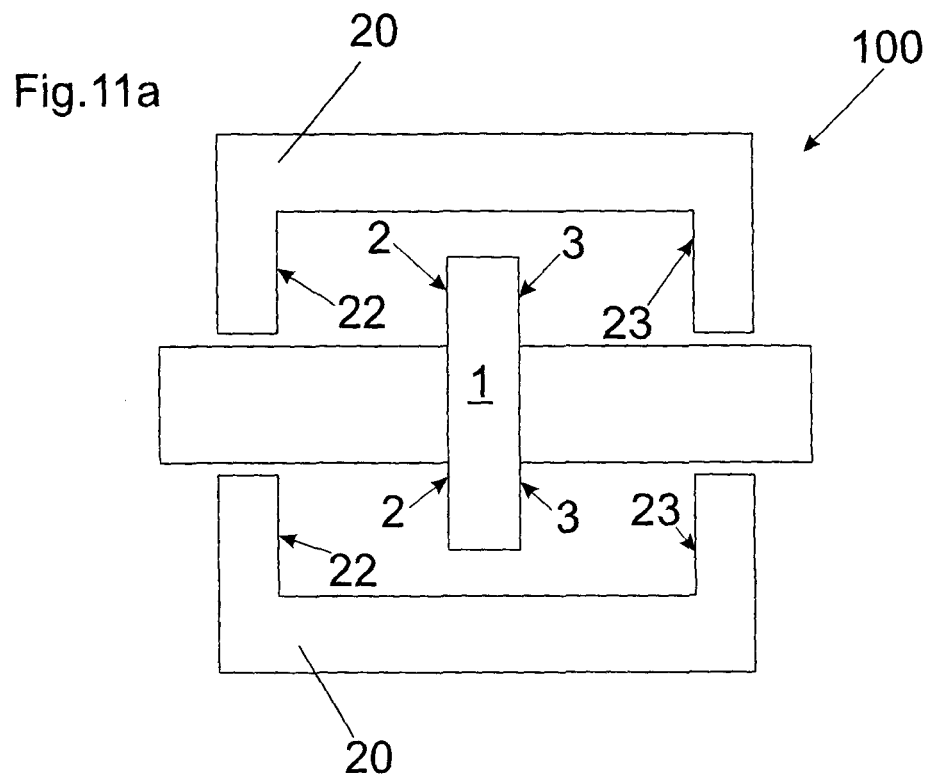
FIG. 11a shows a diagrammatic view of a fixing device.

In that respect FIG. 11a shows a fixing device 100 having a fixing body 20 and a connecting element 1, as described in the preceding Figures.

For fixing on the left-hand side the connecting element 1 is moved towards the left—whether now by screwing, displacement or the like—until the connecting element abutment 2 of the connecting element 1 meets the abutment 22 of the fixing body 20 and thus the fixing device 100 can be fixed at the left.

If fixing is wanted on the right-hand side then the connecting element 1 is moved towards the right until the connecting element abutment 3 on the connecting element 1 meets the abutment 23 on the fixing body 20 and thus the fixing device 100 can be fixed at the right.

Figure 11B:
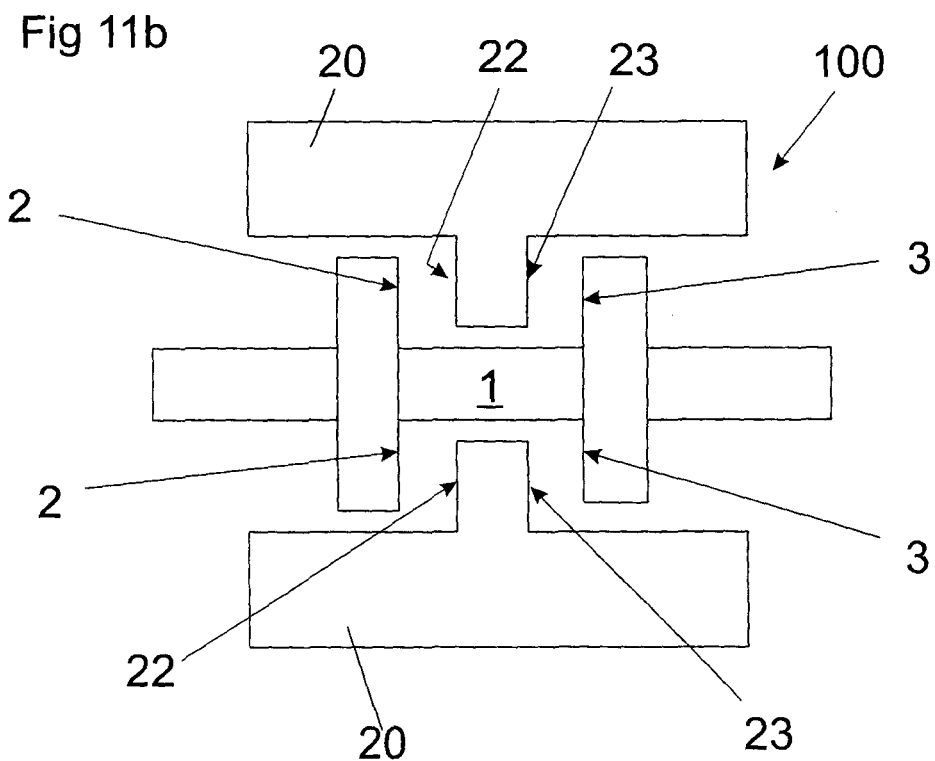
FIG. 11b shows a diagrammatic view of a variant of a fixing device.

FIG. 11b shows a variant of a fixing device 100 as just shown in FIG. 11a. In contrast to the FIG. 11a embodiment the abutments 22 and 23 of the fixing body are now disposed between the connecting element abutments 2 and 3 of the connecting element 1—in contrast to the embodiment in FIG. 11a in which the connecting element abutments 2 and 3 of the connecting element 1 are disposed between the abutments 22 and 23 of the fixing body 20 of the fixing device 100.

Fixing per se is effected in the same manner, that is to say for fixing on the left-hand side the connecting element 1 is moved towards the left until the connecting element abutment 3 meets the abutment 23 on the fixing body 20 and thereby the fixing device 101 can be fixed at the left. For fixing on the right-hand side the connecting element 1 is moved towards the right until the connecting element abutment 2 meets the abutment 22 on the fixing body 20 and thereby the fixing device 100 can be fixed at the right.

The invention claimed is:

1. A fixing device for fixing a furniture fitting to an article of furniture so that the furniture fitting can be fixed to the article furniture with the fixing device selectively with a left-hand side or a right-hand side of the furniture fitting, comprising:

a fixing body having a through opening, the fixing body having at least two fixing body abutments that are provided in or on the fixing body; and a connecting element that is at least partially arranged in the through opening of the fixing body so that it is limitedly movable relative to the fixing body, the connecting element having at least two connecting element abutments and two connecting element fixing regions for fixing the furniture fitting to the article of furniture;

wherein the connecting element is arranged within the fixing body such that it is movable relative to the fixing body to either of two assembly positions for fixing the furniture fitting to the article of furniture using a left-hand side or a right-hand side of the furniture fitting, respectively, where in a first of the two assembly positions one of the at least two fixing body abutments abuts against one of the at least two connecting element abutments so that a first of the two connecting element fixing regions can be used to fix the furniture fitting to the article of furniture, and in a second of the two assembly positions a second of the at least two fixing body abutments abuts against a second of the at least two connecting element abutments so that a second of the two connecting element fixing regions can be used to fix the furniture fitting to the article of furniture.

2. The fixing device of claim 1, wherein the connecting element and the fixing body are jointly in the form of a pre-assembled inseparable structural unit.

3. The fixing device of claim 1, wherein the connecting element extends substantially completely through the through opening in the fixing body.

4. The fixing device of claim 1, wherein, in either of the two assembly positions, one of the two connecting element fixing regions is sunk into the through opening so as not to extend outwardly of the through opening, and the other of the two connecting element fixing regions can be used to fix the furniture fitting to the article of furniture.

5. The fixing device of claim 1, wherein the connecting element is in one piece.

6. The fixing device of claim 1, wherein the connecting element abutments project radially from the connecting element.

7. The fixing device of claim 1, wherein the connecting element abutments are formed by a flange on the connecting element.

8. The fixing device of claim 1, wherein the connecting element fixing regions can be connected to the article of furniture in a force-locking relationship.

9. The fixing device of claim 1, wherein the two connecting element fixing regions can be connected to the article of furniture in a positively-locking relationship.

10. The fixing device of claim 1, wherein the two connecting element fixing regions are formed on the connecting elements symmetrically relative to each other.

11. The fixing device of claim 1, wherein in each of the two assembly positions, one of the two connecting element fixing regions projects out of the through opening for projecting beyond the left-hand side or right-hand side of the furniture fitting.

12. The fixing device of claim 1, wherein the two connecting element fixing regions have respective threads.

13. The fixing device of claim 1, wherein the connecting element has two ends that are both in the form of screw bolts.

14. The fixing device of claim 1, wherein the connecting element has two separate tool receiving formations provided thereon.

15. The fixing device of claim 1, wherein the tool receiving formations are in the form of a slot, a cross slot, a hexagonal recess or a hexalobular recess.

16. A furniture fitting for an article of furniture, the furniture fitting having at least one fixing device for fixing the furniture fitting to the article of furniture according to claim 1.

17. The furniture fitting of claim 16, wherein the fixing body is provided substantially completely in the furniture fitting.

18. The furniture fitting of claim 16, wherein the fixing body abutments are provided in the furniture fitting in a spaced relationship with respect to the left-hand side and the right-hand side of the furniture fitting.

19. The furniture fitting of claim 16, wherein the furniture fitting is in the form of an ejection device, a drive device, a pull-in device or a damping device for a movable furniture part, or in the form of an actuating drive for a furniture flap, or in the form of a drawer extension guide, or in the form of a lighting device.

20. An article of furniture having a furniture fitting as claimed in claim 16.

* * * * *